United States Patent
Green

(10) Patent No.: US 8,021,138 B2
(45) Date of Patent: Sep. 20, 2011

(54) ROTATING BUILD PLATE

(75) Inventor: Gordon Robert Green, Bristol (GB)

(73) Assignee: Materials Solutions, Edgbaston, Birmingham (GB)

( * ) Notice: Subject to any disclaimer, the term of this patent is extended or adjusted under 35 U.S.C. 154(b) by 389 days.

(21) Appl. No.: 12/142,834

(22) Filed: Jun. 20, 2008

(65) Prior Publication Data

US 2008/0317951 A1 Dec. 25, 2008

Related U.S. Application Data

(60) Provisional application No. 60/945,975, filed on Jun. 25, 2007.

(51) Int. Cl.
*B29C 35/08* (2006.01)
*B28B 1/16* (2006.01)
*G06F 19/00* (2011.01)

(52) U.S. Cl. ............ 425/174.4; 425/375; 264/308; 264/497; 700/119

(58) Field of Classification Search ............ 425/174.4, 425/375; 264/497, 113, 308, 401; 700/119, 700/118
See application file for complete search history.

(56) References Cited

U.S. PATENT DOCUMENTS

| | | | |
|---|---|---|---|
| 5,354,414 A * | 10/1994 | Feygin | 216/34 |
| 7,045,738 B1 | 5/2006 | Kovacevic et al. | |
| 2002/0195747 A1 * | 12/2002 | Hull et al. | 264/401 |
| 2003/0003180 A1 * | 1/2003 | Farnworth et al. | 425/174.4 |
| 2003/0059492 A1 | 3/2003 | Gaillard et al. | |
| 2003/0205851 A1 * | 11/2003 | Laschutza et al. | 264/496 |
| 2005/0023256 A1 | 2/2005 | Sankaranarayanan et al. | |
| 2006/0108712 A1 | 5/2006 | Mattes | |

FOREIGN PATENT DOCUMENTS

| | | |
|---|---|---|
| DE | 20305843 U1 | 2/2003 |
| DE | 10 2005 025 19 | 12/2006 |
| EP | 0 499 485 A3 | 8/1992 |
| WO | WO 90/03893 | 4/1990 |
| WO | WO 00/30790 A3 | 6/2000 |
| WO | 2005/080010 A1 | 9/2005 |

* cited by examiner

*Primary Examiner* — Maria Veronica Ewald
(74) *Attorney, Agent, or Firm* — Volentine & Whitt, PLLC

(57) ABSTRACT

1. A powder bed additive layer manufacturing system including a linear traversing re-coater and a build plate characterised in that the build plate is mounted for rotation, relative to the re-coater or movement about an axis.

16 Claims, 3 Drawing Sheets

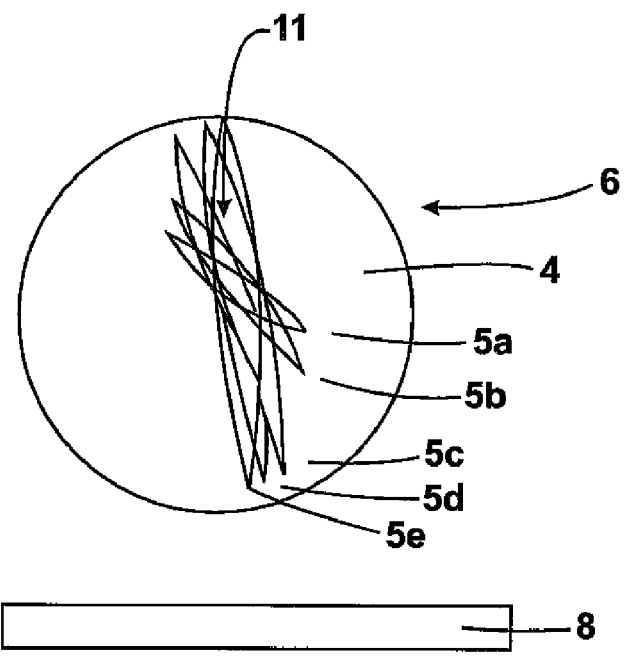
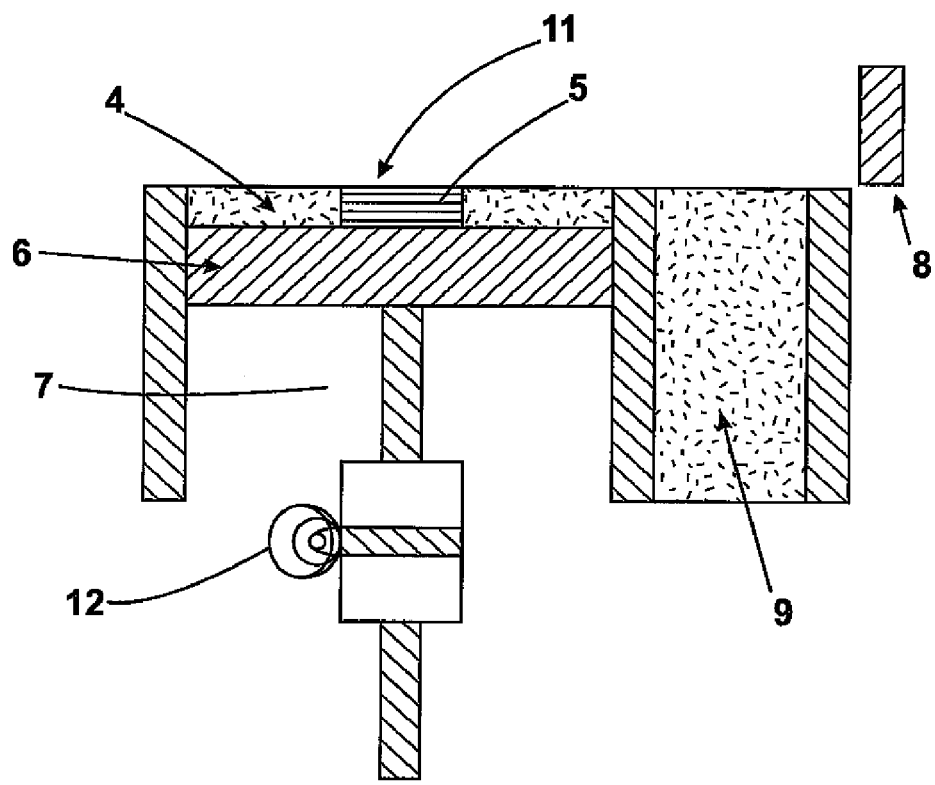
Fig. 2
Fig. 3

ROTATING BUILD PLATE

STATE OF THE ART

Additive Layer Manufacturing (ALM) is a newly-emerging method for making metal parts. A commonly used approach is the so-called "powder bed" system. This is illustrated schematically in FIG. 1.

An infra-red laser 1 is directed by scanning optics 2 such that the beam 3 defines a 2-dimensional pattern in a thin bed of metal powder 4. Where the laser impinges upon the bed of powder, the powder is fused to form a solid layer 5 bonded to a base plate 6. When the first layer is completed, the build plate is indexed down by the elevator mechanism 7. The powder bed is then replenished to the original level by the re-coater 8 which scans horizontally so as to scrape powder from supply hopper 9 and deposit a uniform layer above the previously scanned layer. The second layer of powder is then scanned so as to fuse the required areas of powder onto the previously fused layer 5. By repeating this process, a 3-dimensional form is progressively build up, being composed of multiple 2-dimensional layers 5. The thickness of the individual layers is typically 20-50 um.

The powder bed 4 typically measures 250 mm×250 mm in plan view and the build plate 6 can be lowered by typically 200 mm. Thus parts up to 250 mm×250 mm×200 mm can be manufactured in such equipment. It should be understood that these are not fundamental limits however. It is entirely conceivable that scanning optics could be designed to cover a larger powder bed area and also that the elevator mechanism could be designed to extend the maximum build height.

In some powder bed systems, the re-coater 8 has a precision ground ceramic blade on its lower edge. During the re-coating process, this translates across the powder bed area, nominally clearing the previously fused layer 5 by the layer thickness dimension. However there are in practice a number of factors which contribute to there being considerable frictional forces between the re-coater blade and the previously fused layer. Firstly, the surface roughness of the previously fused layer is comparable to the layer thickness, resulting in a degree of interference between it and the blade. Secondly, the powder generally contains a proportion of particles whose size is similar to or larger than the layer thickness which again results in a degree of interference as the re-coater blade scans. Thirdly, the re-coater blade pushes a "wave" of powder before it which can cause dynamic pressures against the leading edge of the developing fused part. Likewise, thermally induced stresses within the part can cause slight geometric distortions which contribute additional interference-related forces.

For parts which possess intrinsic stiffness imparted by their geometry, the above frictional forces may not be of particular significance. However a desirable feature of the powder bed technology is its ability to accurately resolve sub-millimeter features and many parts which could take advantage of this characteristic can suffer from mechanical distortion during manufacture due to the above frictional forces. High aspect ratio (tall or wide compared to thickness) wall-like features are particularly prone to damage. Problems can be minimised by advantageously orientating the part with respect to the direction of travel of the re-coater. However this is not always possible.

SUMMARY OF THE INVENTION

There is a class of parts which could advantageously be manufactured by powder bed ALM technology and which are of high aspect ratio, but where the optimal build orientation is not constant through the build height. Aerodynamic blades where a thin aerofoil section twists along the length of the blade would be an example. This invention concerns the addition of a rotation axis to the build plate. By this means, the build plate can be incrementally rotated as the build progresses such that, layer by layer, the part is orientated to present any fragile, high aspect ratio features at the optimal angle to the re-coater travel direction. Thus in the example cited, the build plate (which could be circular, rather than rectangular) rotates slightly with each downward step so as to maintain the thin aerofoil section approximately parallel to the re-coater travel direction. A geometrical transformation algorithm within the control software adjusts the laser scanning geometry to match the build plate rotation. Such coordinate transformations are well known and will not be described here.

From one aspect the invention includes a powder bed additive layer manufacturing system including a linear traversing re-coater and a build plate characterised in that the build plate is mounted for rotation, relative to the re-coater or movement about an axis A motor may incrementally rotate the build plate. Additionally or alternatively a control system may be provided for controlling the rotation. The axis of rotation is preferably vertical and the build plate may be circular.

From another aspect the invention includes a powder bed additive layer manufacturing system including a linear traversing re-coater and a build plate elevator mechanism where in the build plate elevator mechanism incorporates a rotation axis.

From another aspect the invention includes A powder bed additive layer manufacturing system re-coater mechanism incorporating a rotation axis and a linear traverse axis.

Additionally the invention includes a method of forming a body have parts of different orientations including succesively depositing and forming layers of powdered material onto a build plate using a transverse movement re-coater operating along a line of movement characterised in orientating the uppermost deposited layer so that it lies substantially orthogonal to the line of movement before the next layer is deposited The rotation axis may be vertical and additionally or alternatively orthogonal to the line of movement of the re-coater. A control system may progressively rotate the build plate between layers. The control system may incorporate coordinate transformation algorithms for aligning the 2-dimensional layer geometry to the rotation of the build plate.

The manufacturing system may include scanning optics for directing a fusing beam and those optics may be approximately aligned with a centre line of the build plate.

Although the invention has been defined above it is to be understood that the invention includes any inventive combination of the features set out above or in the following description.

The invention may be performed in various ways and specific embodiment will now be described with reference to the accompanying drawings, in which:

FIG. 2 is a schematic plan illustrating a problem identified by the Applicants; and FIG. 3 is a schematic view of a further embodiment of the invention.

The in general embodiments would most likely involve a circular build plate, but might be some other shape. The build plate has a rotation axis and may be mounted between the elevator mechanism and the build plate, or have the elevator mounted on an outer rotation axis. Both would be feasible embodiments of the invention. It is also possible to rotate the re-coater system rather than the build plate. It should be understood that this is entirely equivalent to this invention.

Figure 1:
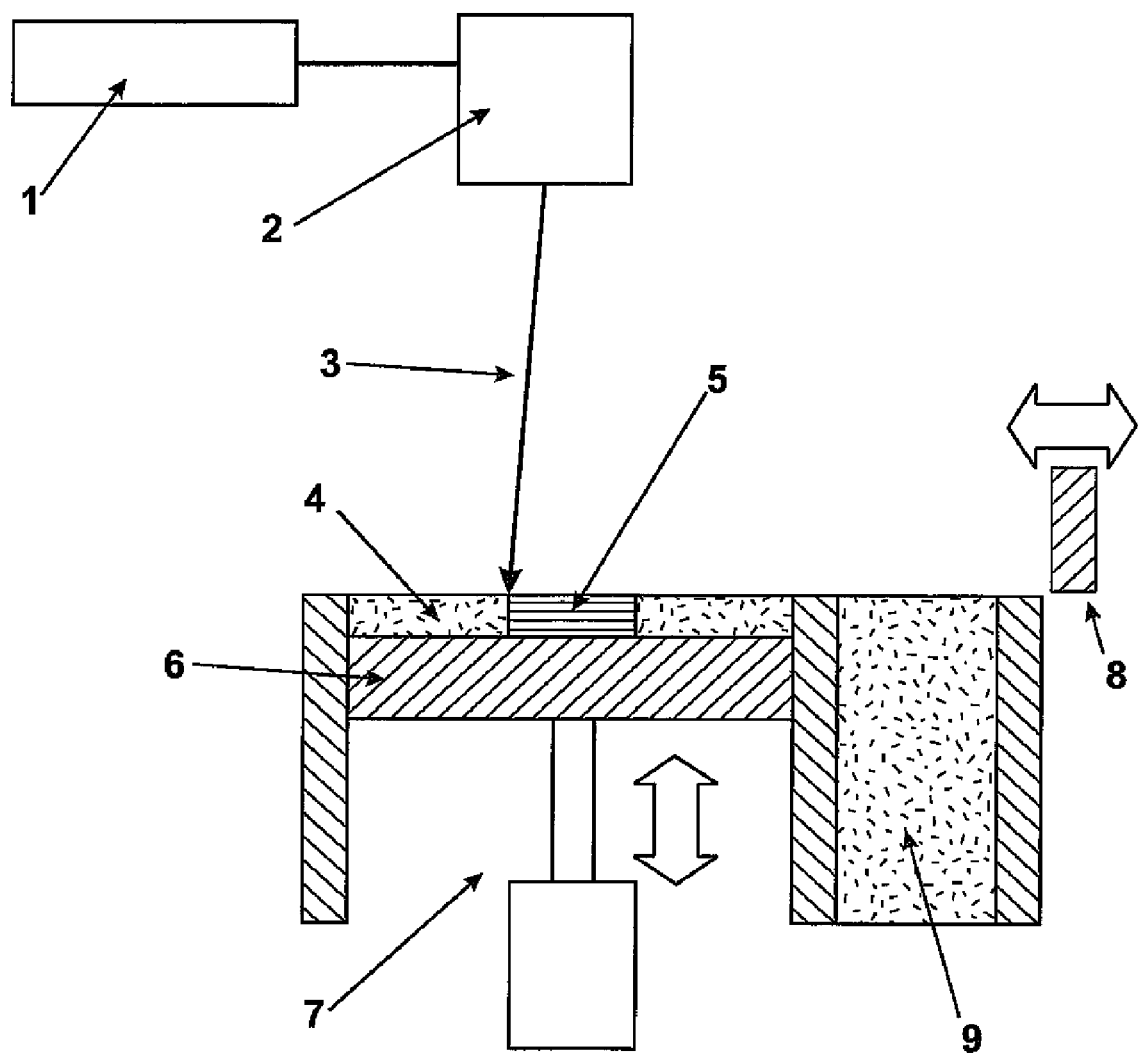
FIG. 1 is a prior art arrangement already described whist
Figure 1A:
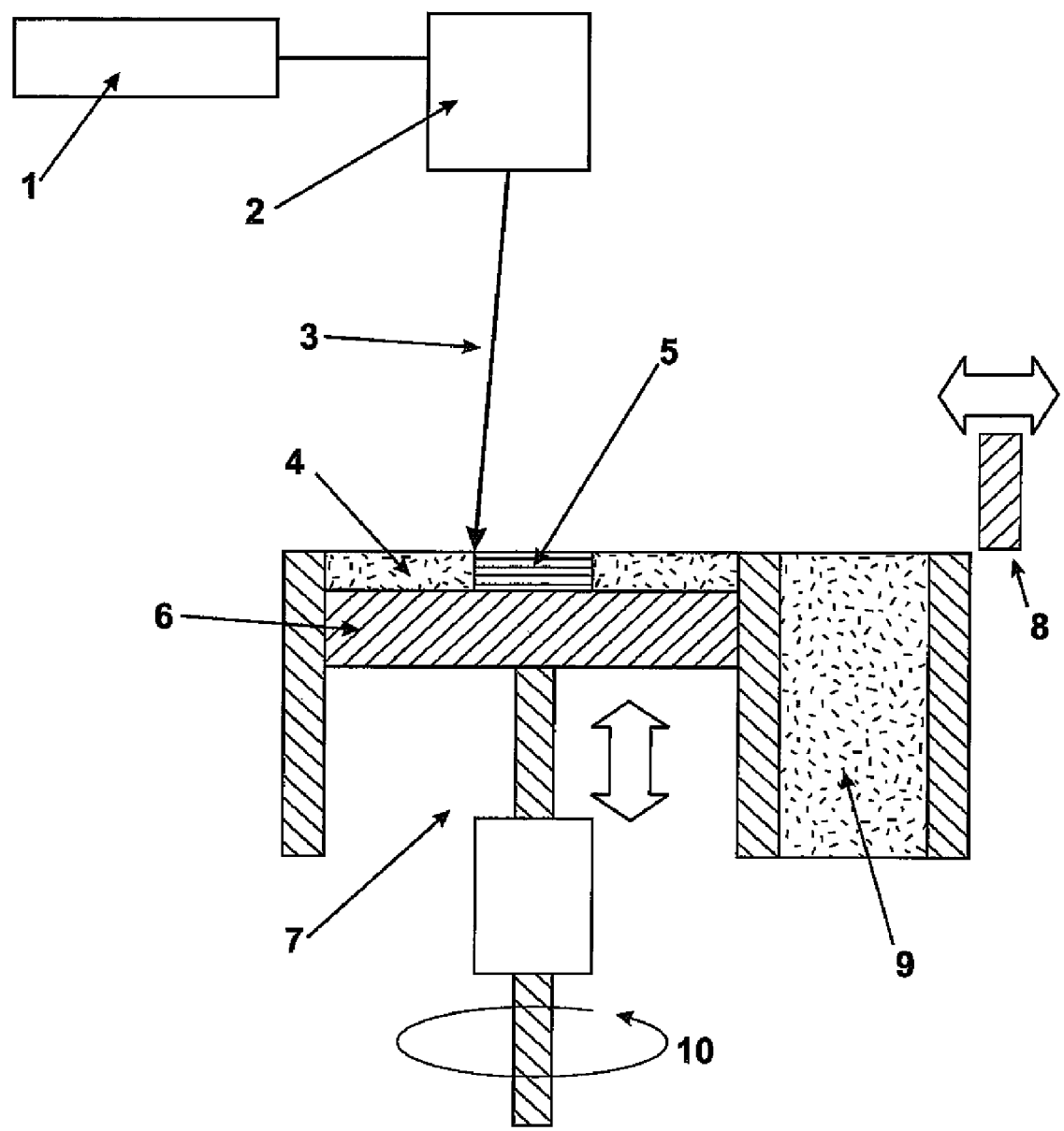
FIG. 1A is an inventive variant.

At FIG. 1A the invention is diagrammatically illustrated at 10 in that the built plate and/or the recoater system rotate with respect to each other thereby changing the orientation of a part with respect to the direction of travel of the recoater. In the example illustrated at FIG. 3 the build plate rotates by means of device 12 and the recoater linearly traverses across the powder bed 4 and upper solid layer 5. An equivalent system would rotate the recoater with respect to the part built three dimensional object 11.

At FIG. 2 is diagrammatically shown a plan view of the problem to solve. Powder bed 4 lies upon a circular built plate 6 and contains a part-built object 11 consisting in part of multiple fused layers 5a~5e. These layers have an orientation and this orientation is not constant. An example of such an object is a propeller blade or vane perpendicular to the build plate. Without rotation, as in the prior art one 'slice' of the object may be head on to the recoater and another slice may be substantially parallel to the recoater.

At FIG. 3 a device is shown at 12 for rotating the build plate and thereby the part-build object 11 fused to it, with respect to the linear traverse of the recoater 8.

In the method of invention more than one layer 5 of the object 11 (consisting of multiple layers 5) is advantageously orientated with respect to the direction of travel of the recoater. Applicant's may further provide a drive system to rotate the build plate (or recoater) and further a control system to progressively rotate the build plate (or recoater) between layer depositions. Preferably has the centre line of the scanning optics is at or near to the centre line of the build plate, which conveniently is the axis of rotation.

Whilst for any geometry of part a fixed orientation with respect to the traverse of the recoater system 8 may be selected, the Applicants approach allows a new selection of orientation for each layer 5a~5e and the optimal orientation will be that selected for the next powder layer to be put down by the recoater. By this means the orientation of the object 11 with respect to a traverse of the recoater may be selected to avoid distortion or destruction of the uppermost layer 5.

Whilst fused layer 5e may build satisfactorily, without the ability to rotate build plate 6, layer 5a may be distorted or damaged thereby ruining the entire object 11. As the layers 5 may be 20 microns deep and take ~1 minute to form there is a clear economic advantage in being able to assure that complex objects 11 are successfully completed in a minimal build time.

The invention claimed is:

1. A powder bed additive layer manufacturing system including: a recoater system comprising a linear traversing re-coater and a powder dispenser for dispensing particulate material; and a build plate having an upper surface positioned to receive powder dispensed by the powder dispenser and spread by a linear traverse of the re-coater, characterized in that the build plate is rotatable about an axis relative to the recoater system,
wherein the system further includes a control system for controlling the rotational orientation of the build plate in accordance with the orientation of a feature to be made in the next layer.

2. A powder bed additive layer manufacturing system including: a recoater system comprising a linear traversing re-coater and a powder dispenser for dispensing particulate material; and a build plate having an upper surface positioned to receive powder dispensed by the powder dispenser and spread by a linear traverse of the re-coater, characterized in that the build plate is rotatable about an axis relative to the recoater system,
wherein the system further includes a motor for incrementally rotating the build plate, and a control system for controlling the rotational orientation of the build plate in accordance with the orientation of a feature to be made in the next layer.

3. The system as claimed in claim 1 including a control system for progressively rotating the build plate between layer depositions.

4. The system as claimed in claim 2 including a control system for progressively rotating the build plate between layer depositions.

5. The system as claimed in claim 1 wherein the axis is vertical.

6. The system as claimed in claim 1 wherein the build plate is circular.

7. The system as claimed in claim 2 wherein the build plate is circular.

8. The system as claimed in claim 1 including scanning optics for directing a fusing beam and wherein an optical axis of the scanning optics is approximately aligned with the centre of the build plate.

9. A powder bed additive layer manufacturing system including: a recoater system comprising a linear traversing re-coater and a powder dispenser for dispensing particulate material; a build plate having an upper surface positioned to receive powder dispensed by the powder dispenser and spread by a linear traverse of the re-coater; and a build plate elevator mechanism connected to the build plate so as to selectively raise and lower the build plate relative to the recoater system, wherein the build plate elevator mechanism is supported so as to be rotatable about a rotation axis, whereby the build plate is rotatable relative to the recoater system,
wherein the system further includes a control system for progressively rotating the build plate between layers, and wherein the control system incorporates coordinate transformation algorithms for aligning the 2-dimensional layer geometry to the rotation of the build plate.

10. The system as claimed in claim 9 wherein the rotation axis is approximately vertical.

11. The system as claimed in claim 9 wherein the build plate is circular.

12. The system as claimed in claim 9 including scanning optics for directing a fusing beam and wherein an optical axis of the scanning optics is approximately aligned with the centre of the build plate.

13. The system as claimed in claim 1, wherein the powder dispenser is a hopper disposed adjacent the periphery of the build plate.

14. The system as claimed in claim 1, wherein the re-coater comprises a blade having an edge oriented substantially orthogonally to the axis, and the blade is supported such that the edge thereof remains substantially orthogonal to the axis as said one of the recoater system and the build plate is rotated about the axis relative to said other of the build plate and the recoater system.

15. The system as claimed in claim 9, wherein the powder dispenser is a hopper disposed adjacent the periphery of the build plate.

16. The system as claimed in claim 9, wherein the re-coater comprises a blade having an edge oriented substantially orthogonally to the axis, and the blade is supported such that the edge thereof remains substantially orthogonal to the axis as said one of the recoater system and the build plate is rotated about the axis relative to said other of the build plate and the recoater system.

* * * * *